(12) United States Patent
Iseli (10) Patent No.: US 6,997,307 B2
(45) Date of Patent: Feb. 14, 2006

(54) DEVICE FOR TENSIONING AND LOOSENING OF AN ENDLESS CONVEYOR BELT WHICH IS GUIDED OVER DEFLECTION MEANS

(75) Inventor: Hansrudolf Iseli, Allschwil (CH)

(73) Assignee: Habasit AG, Reinach (CH)

(*) Notice: Subject to any disclaimer, the term of this patent is extended or adjusted under 35 U.S.C. 154(b) by 0 days.

(21) Appl. No.: 10/879,987

(22) Filed: Jun. 29, 2004

(65) Prior Publication Data

US 2005/0045452 A1 Mar. 3, 2005

(30) Foreign Application Priority Data

Jul. 1, 2003 (EP) .................................. 03014900

(51) Int. Cl.
*B65G 23/44* (2006.01)
(52) U.S. Cl. ...................................... 198/813; 198/841
(58) Field of Classification Search ................. 198/813
See application file for complete search history.

(56) References Cited

U.S. PATENT DOCUMENTS

| 3,921,793 | A | | 11/1975 | Hutchinson et al. |
| 3,993,185 | A | * | 11/1976 | Fleckenstein et al. ....... 198/813 |
| 4,007,827 | A | * | 2/1977 | Mattos .................... 198/861.1 |
| 5,156,261 | A | | 10/1992 | Dorner |
| 5,896,979 | A | * | 4/1999 | Hokari et al. ................ 198/807 |
| 5,984,083 | A | * | 11/1999 | Hosch et al. .......... 198/810.04 |
| 6,193,052 | B1 | | 2/2001 | Cloud et al. |
| 6,298,981 | B1 | | 10/2001 | Hosch et al. |
| 2003/0183493 | A1 | * | 10/2003 | Ertel et al. .................. 198/841 |

FOREIGN PATENT DOCUMENTS

| DE | 42 33 131 A1 | 4/1994 |
| FR | 2 465 662 A | 3/1981 |
| NL | 9002835 A | 7/1992 |

* cited by examiner

*Primary Examiner*—Gene O. Crawford
*Assistant Examiner*—Mark A. Deuble
(74) *Attorney, Agent, or Firm*—Hodgson Russ LLP (57) ABSTRACT

A device for tensioning and loosening of an endless conveyor belt (1) which is guided over deflection means, is additionally supported between the deflection means by a support construction (2). The device comprises displacement means (3) which are used for displacing of displaceable deflection means (4) parallel to the direction of travel of the conveyor belt (1). In addition it comprises support means (5), which are co-displaceable with the displacing of the displaceable deflection means (4). In this way the support means (5) support the conveyor belt (1) between the support construction (2) and the displaceable deflection means (4) throughout. Thereby the conveyor belt (1) does not sag down in a gap between the support construction (2) and the displaceable deflection means (4).

9 Claims, 6 Drawing Sheets

Fig. 12

DEVICE FOR TENSIONING AND LOOSENING OF AN ENDLESS CONVEYOR BELT WHICH IS GUIDED OVER DEFLECTION MEANS

FIELD OF THE INVENTION

The invention relates to a device for tensioning and loosening of an endless conveyor belt which is guided over deflection means.

BACKGROUND OF THE INVENTION

Such devices are, for example, used on endless conveyor belts made from synthetic material members of any width, for loosening these out of an operationally suitable slightly tensioned condition or for tensioning these into an operationally suitable condition. This occurs when the distance between two deflection rollers, over which the conveyor belt is guided, is reduced or enlarged. The loosened condition of the conveyor belt can facilitate different processes, such as, for example, maintenance work on the conveyor belt, in particular the cleaning. For this, a raising of the conveyor belt by means of a suitable aid can additionally be useful.

Different solution attempts were already proposed in the past for loosening and stretching of endless conveyor belts. For example, in NL 9002835 A a construction is proposed, in which the distance between the deflection rollers is changed on a plane parallel to the direction of travel of the belt. Characteristic of the device proposed in NL 9002835 A is that it keeps the conveyor belt in tensioned condition under a constant operational tension and, for example, compensates for temperature dependent stretching or contraction.

As a further example, in DE 42 33 131 A1, a device for tensioning and loosening of an endless conveyor belt is disclosed, in which one of the deflection rollers is arranged on a swivelling-supported tension lever. Through swivelling of the tension lever, the distance changes between the deflection rollers, and the conveyor belt is tensioned or loosened.

Furthermore, devices for tensioning and loosening of an endless conveyor belt are currently utilized, in which the distance between the deflection rollers is changed manually on a level parallel to the direction of travel of the belt. The deflection roller to be displaced is able to be manually loosened from a frame of a conveyor belt conveying system and guided displaceably. Such devices do not guarantee that the deflection roller is evenly displaced, i.e. the same in the direction of travel left and right.

As well as the devices for tensioning and loosening of endless conveyor belts, supporting structures are currently utilized, which support the conveyor belt in its course between the deflection rollers in the carrying of its own weight and the weight of the goods transported on its surface. For deflection rollers which are able to be loosened, a gap between the support construction and the deflection roller is provided, so that the deflection roller does not collide with the support construction when loosening. These gaps can result in an unclean operational run occurring and increased wear and tear on the conveyor belt.

The object of the present invention is therefore to provide a device for tensioning and loosening of an endless conveyor belt which is guided over deflection means, which guarantees that in operation the conveyor belt is supported also between the displaceable deflection means and the support construction. Preferably the displacement of the deflection roller should occur evenly.

SUMMARY OF THE INVENTION

The object is achieved in accordance with the invention by a device which is defined in the following description and the appended claims.

The essence of the invention consists of the following: A device for tensioning and loosening of an endless conveyor belt which is guided over deflection means, which is additionally supported between the deflection means by a support construction, comprises displacement means for displacing of displaceable deflection means parallel to the direction of travel of the conveyor belt. In addition it comprises support means, which are co-displaceable with the displacing of the displaceable deflection means parallel to the direction of travel of a conveyor belt. In this way the support means support the conveyor belt between the support construction and the displaceable deflection means.

The device according to the invention has the advantage that the conveyor belt does not sag down in a gap between the support construction and the displaceable deflection means, so that the conveyor belt runs more smoothly and has less wear and tear.

The support means of the device are preferably designed so that they support the conveyor belt throughout in each displacement position, in the region between the support construction and the displaceable deflection means, in which the conveyor belt is not supported by the support construction and the displaceable deflection means. A gap-free support of the conveyor belt throughout guarantees an ideal smooth run and a minimal wear and tear of the same.

For a preferred embodiment the support means comprise at least two sliding bar pieces which are spaced apart from each other. This type of support means is in particular used when the support construction comprises sliding bars. The sliding bar pieces of the support means are generally arranged laterally offset to the sliding bars of the support construction. By a displacement of the support means in the plane of the support construction and in the direction of travel of the conveyor belt, it is guaranteed that the support means and the support construction engage in each other without colliding, and that the conveyor belt is supported throughout in each displacement position of the displaceable deflection means.

Preferably the displacement means comprise two crank levers, which are connected via a crank axle such that they are not rotatable in relation to each other, and are each rotatably connected with a lever rod via a link, the lever rods for their part being connected with the displaceable deflection means. With such displacement means the deflection means to be displaced are automatically displaceable parallel, i.e. the same in the direction of travel of the conveyor belt left and right. In addition, it guarantees that the tensioning and loosening length can be repeatably maintained the same size. Such a design of the displacement means works by the knee lever principle and causes the transmission from operating force to tensioning force to constantly increase during the tensioning of the conveyor belt, which makes the tensioning process easier.

With advantage the displaceable deflection means have a deflection axle and the displacement means are arranged such that the links in the tensioned conveyor belt lie in a plane between the deflection axle and the crank axle. In this way, in the operational position of the conveyor belt i.e. in tensioned state, no torque on the displacement means is caused, which is brought about through the tension of the conveyor belt.

Preferably the displacement means have an operating lever connected with the crank axle, with which the crank axle is rotatable. With such an operating lever, the device can be manually or automatically operated.

In a preferred embodiment, the crank levers or the lever rods of the displacement means are sprung designed, in particular as coil springs or pneumatic springs. In this way they constantly compensate for a possible longitudinal deformation of the conveyor belt during operation and guarantee an operationally suitable tension.

Preferably the lever rods of the displacement means have several connection gaps, via which they are adjustably connected with the crank levers or with the displaceable deflection means. Therefore the tensioning length and loosening length of the device and the sagging of the conveyor belt in the lower loop section can be adjusted and changed.

For a preferred embodiment the device according to the invention has means for automated rotating of the crank lever, in particular a pneumatic cylinder. Such a device facilitates a tensioning and loosening of the conveyor belt without manual input.

Preferably the displaceable deflection means are fixedly connected with the support means. This results in the fact that the support means always exactly follows the displacement of the deflection means, which simplifies support of the conveyor belt throughout.

BRIEF DESCRIPTION OF THE DRAWINGS

In the following the device according to the invention for tensioning and loosening an endless conveyor belt which is guided over deflection means is described in more detail by way of exemplary embodiments and with reference to the attached drawings, in which.

DETAILED DESCRIPTION OF THE INVENTION

Figure 1:
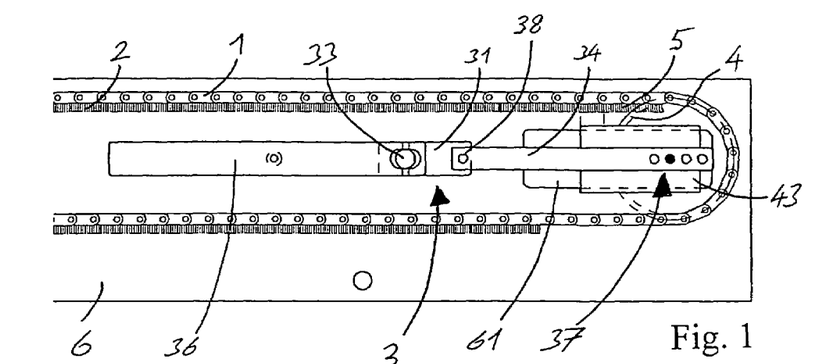
FIG. 1—shows a side view of a first embodiment of a conveyor belt conveying system with a device according to the invention for tensioning and loosening an endless conveyor belt, which is guided over deflection means comprising toothed deflection wheels, in tensioned condition.
Figure 2:
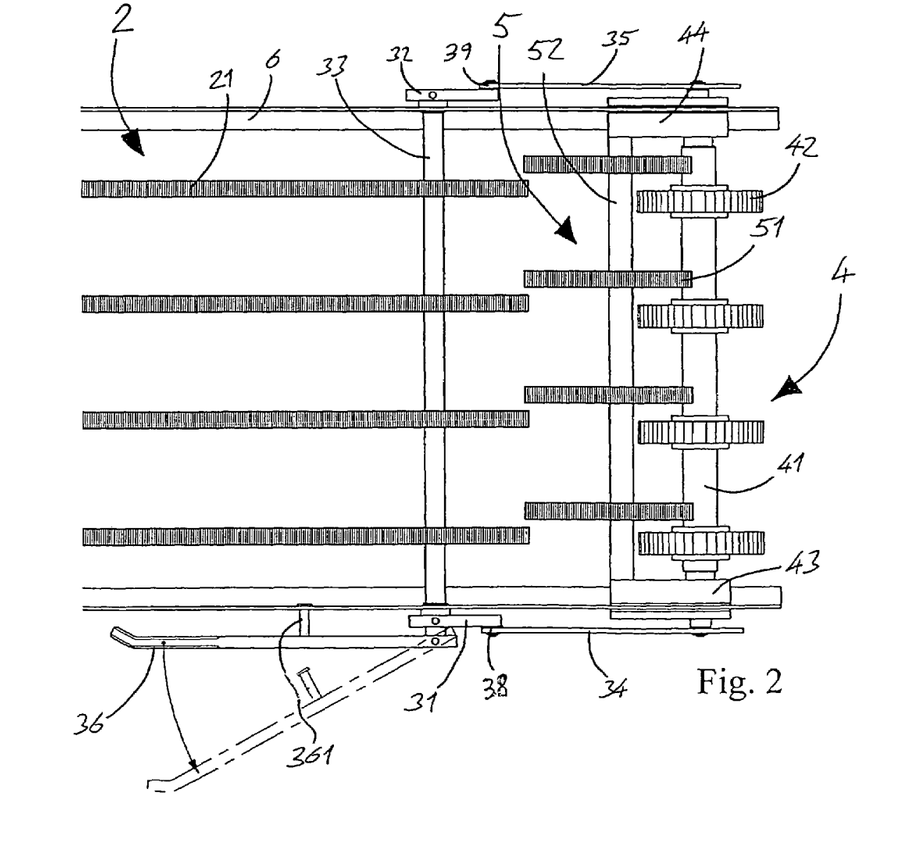
FIG. 2—shows a top view of a conveyor belt conveying system according to FIG. 1.

A first embodiment of a conveyor belt conveying system with a device according to the invention in tensioned condition is shown in FIGS. 1 and 2. An endless conveyor belt 1 comprising synthetic members, is horizontally guided over a support construction 2, which comprises several sliding bars 21, which are spaced apart from each other and arranged in the direction of travel of the conveyor belt 1. At the end of the conveyor belt conveying system the conveyor belt 1 is diverted around 180° over displaceable deflection means 4. These comprise a deflection axle 41 and toothed deflection wheels 42, which are connected with the deflection axle 41. In operation the toothed deflection wheels 42 mesh with the teeth in gaps of the conveyor belt 1 and deflect these without slippage. The deflection axle 41 is positioned in deflection axle bearings 43, 44, which are each displaceably guided in a gap 61 in a frame 6 of the conveyor belt conveying system at a distance from the end of the support construction 2, which in the tensioned condition corresponds to about one and a half times tensioning or loosening length.

The displaceable deflection means 4 are displaceable on a plane, thus horizontal, through displacement means 3 parallel to the conveyor belt 1. The displacement means 3 comprise two crank levers 31, 32, each of which on one of its ends are connected with a crank axle 33 such that they can not be rotated in relation to it, and two lever rods 34, 35, which are each connected via a link 38, 39 with the other end of one of the crank levers 31, 32. The lever rods 34, 35 have connection gaps 37, and via one of these the displaceable deflection means 4 are connected to it. The links 38, 39 are each bendable or stretchable in a plane, which runs perpendicular to the plane of displacement of the displaceable deflection means 4 and parallel to the direction of travel of the conveyor belt 1.

An operating lever 36 is additionally connected with the crank axle 33, with which the crank axle 33 is rotatable. For a simplified service of the device according to the invention the operating lever 36 can be moved away laterally from the frame 6 of the conveyor belt conveying system. In the moved back state the operating lever 36 is fastened with a positioning pin 361 via a gap in the frame 6 of the conveyor belt conveying system, so that it does not interferingly stick out from the conveyor belt conveying system.

In tensioned condition of the device according to the invention the deflection axle 41 of the displaceable deflection means 4 lies with the links 38, 39 and the crank axle 33 in a horizontal plane. The operating lever 36, the crank levers 31, 32 and the lever rods 34, 35 are in the same plane. In this way, in tensioned condition, no torque, which is produced through tension force, is caused on the crank axle 33.

The embodiment shown in FIGS. 1 and 2 of the device according to the invention has, in addition, support means 5, which together with the support construction 2 and the deflection means 4, supports the conveyor belt 1 in carrying its own weight and the weight of the goods arranged on its surface. The support means 5 comprise a transverse bar 52, on which the same number of sliding bar pieces 51, which are about two times tensioned or loosened length, is arranged as the support construction 2 comprises sliding bars 21. The transverse bar 52 is tightly connected via the deflection axle bearings 43, 44 with the displaceable deflection means 4, such that the support means 5 are displaced together with the displaceable deflection means 4.

The sliding bar pieces 51 are arranged laterally offset to the sliding bars 21 in the direction of travel of the conveyor belt 1, ending in direction of travel on the one side at the height of the deflection axle 41 and overlapping in the direction of travel on the other side at the end of the support construction 2 a little. Through this arrangement of the support means 5, the conveyor belt 1 is supported throughout between the support construction 2 and the displaceable deflection means 4, with which a clean run of the conveyor belt 1 is guaranteed.

A further support construction is provided for the lower loop section of the conveyor belt 1, in order to take up the weight of the conveyor belt 1 itself also on the underside. Between this support construction and the displaceable deflection means 4 a belt sagging is present which is appropriate in length and depth, since the conveyor belt 1 can lengthen or shorten through temperature changes or through wear and tear in the links of the members. Via the choice of the connection gaps 37, via which the lever rods 34, 35 are connected with the displaceable deflection means 4, the belt sagging can be adjusted.

Figures 3, 4:
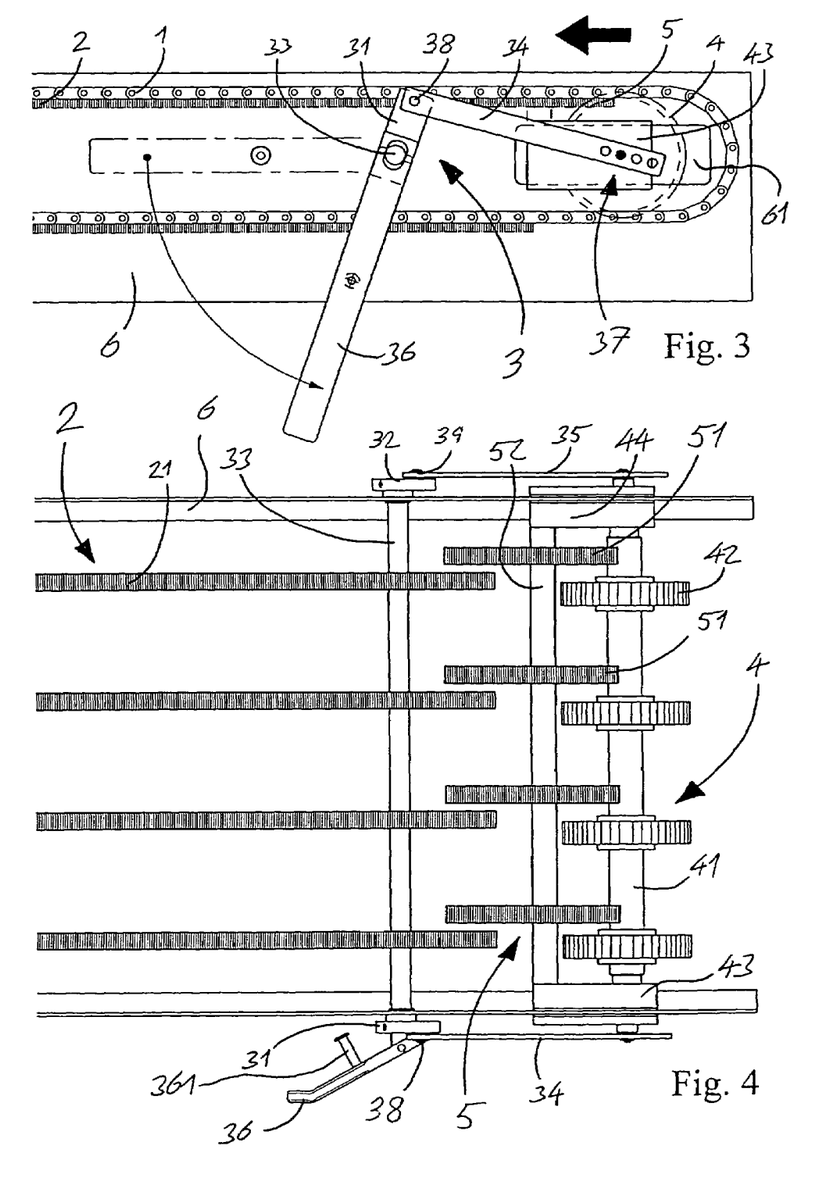
FIG. 3—shows a side view of the conveyor belt conveying system of FIG. 1, in which the device according to the invention is shown in loosened condition.
FIG. 4—shows a top view of the conveyor belt conveying system according to FIG. 3.

FIGS. 3 and 4 show the device according to the FIGS. 1 and 2 in a loosened condition. A rotation of the operating lever 36 about the crank axle 33 from the tensioned position rotates the crank axle 33, and with it the crank levers 31, 32. The links 38, 39 between the crank levers 31, 32 and the lever rods 34, 35 bend with the rotation of the operating lever 36 and the ends of the lever rods 34, 35 connected with the crank levers 31, 32, are rotated about the crank axle 33. In this way the lever rods 34, 35 are displaced and the distance between the crank axle 33 and the deflection axle 41 is reduced. At the same time the support means 5 displace together with the displaceable deflection means 4 in the direction of travel of the conveyor belt 1.

For tensioning of the conveyor belt 1, the operating lever 36 is rotated in the opposing direction, until the links 38, 39 lie on the plane with the deflection axle 41 and the crank axle 33. During this tensioning process the ratio of tension strength to operating force increases steadily, which guarantees an easy manual operation of the device.

The following statement applies for the whole further description: If reference signs are contained in a Figure for the purpose clarity, but are not mentioned in the direct accompanying text of the description, reference is to be made to their explanation in the preceding description of Figures.

Figure 5:
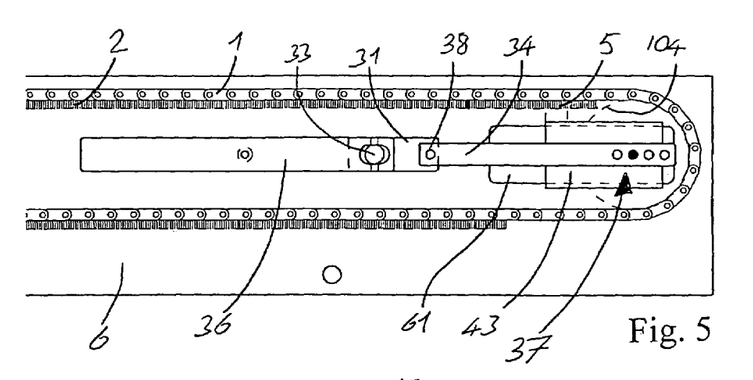
FIG. 5—shows a side view of a second embodiment of a conveyor belt conveying system with a device according to the invention for tensioning and loosening an endless conveyor belt, which is guided over deflection means comprising a deflection roller, in tensioned condition.
Figure 6:
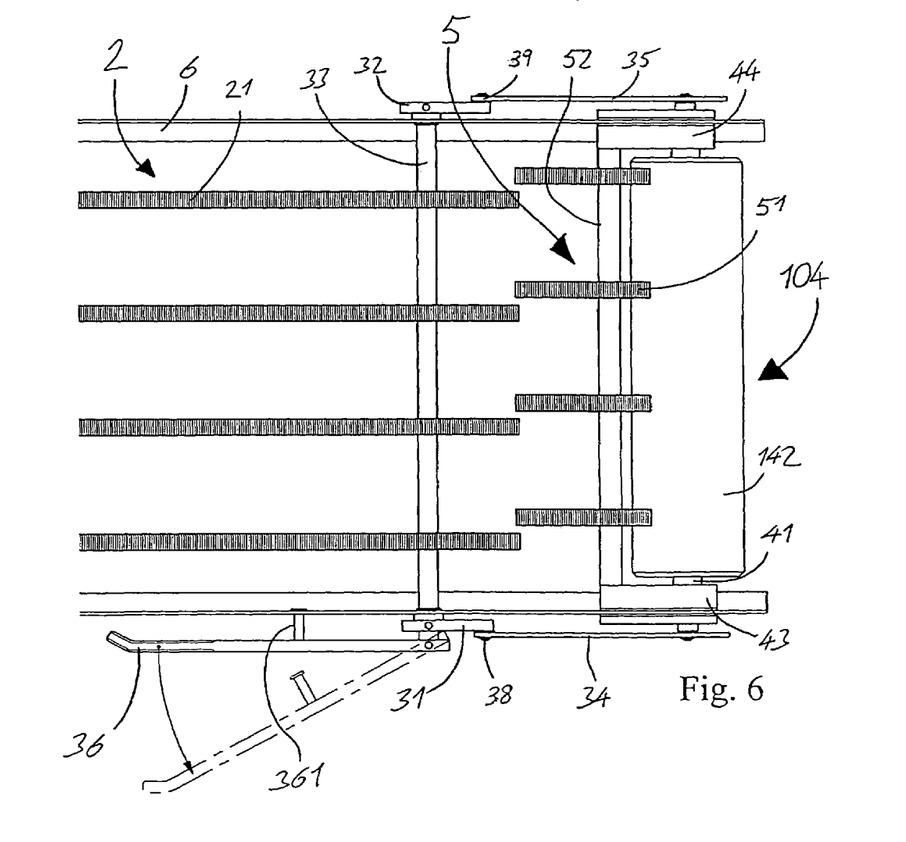
FIG. 6—shows a top view of the conveyor belt conveying system according to FIG. 5.

In the FIGS. 5 and 6 a second embodiment of a conveyor belt conveying system with a device according to the invention in tensioned condition is depicted, wherein the displaceable deflection means 104 comprises a deflection roller 142 instead of toothed deflection wheels. Otherwise what has been said for the first embodiment applies.

Figure 7:
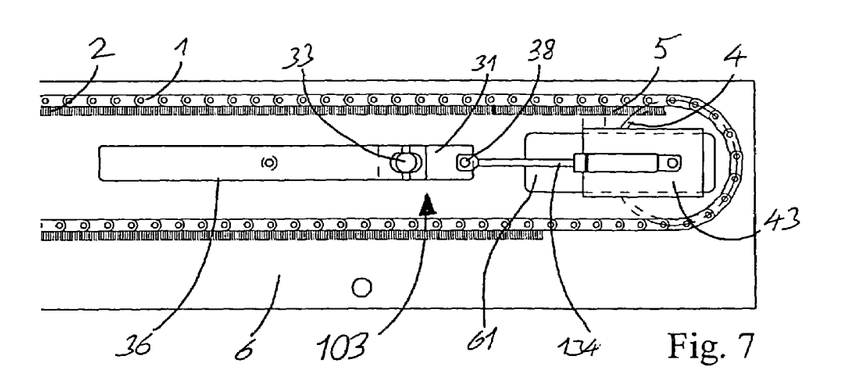
FIG. 7—shows a side view of a third embodiment of a conveyor belt conveying system with a device according to the invention for tensioning and loosening an endless conveyor belt, which is guided over deflection means, in tensioned condition, in which the device according to the invention is designed with sprung lever rods.
Figure 8:
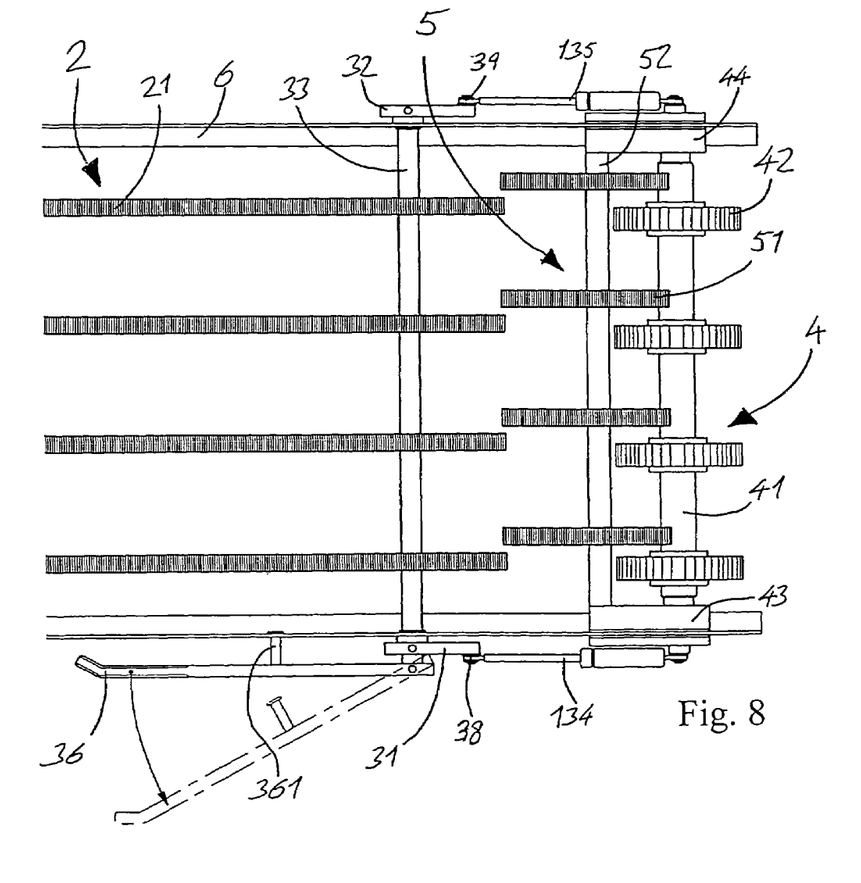
FIG. 8—shows a top view of the conveyor belt conveying system according to FIG. 7.

The FIGS. 7 and 8 show a third embodiment of a conveyor belt conveying system with a device according to the invention in tensioned condition, wherein the displacement means 103 comprise sprung-designed lever rods 134, 135. The lever rods 134, 135 comprise for this reason coil or pneumatic springs. In tensioned condition of the conveyor belt 1 an additional tension force works through the sprung lever rods 134, 135 on the displaceable deflection means 4 and with that on the conveyor belt 1. By means of sprung lever rods 134, 135 so arranged, a belt tension can be produced which guarantees operation of the conveyor belt 1 without slippage, also when no belt sagging is present. That can especially be an advantage for spatial ratios which do not permit sufficient belt sagging.

Otherwise what has been said for the first embodiment applies.

Figure 9:
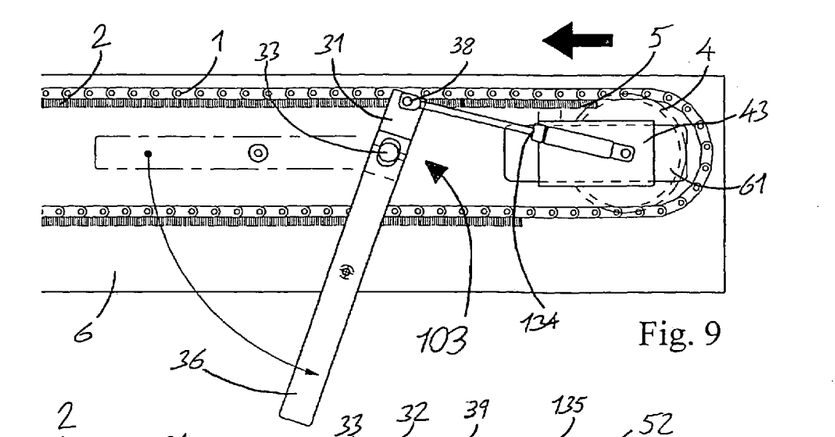
FIG. 9—shows a side view of the conveyor belt conveying system according to FIG. 7, in which the device according to the invention is shown in loosened condition.
Figure 10:
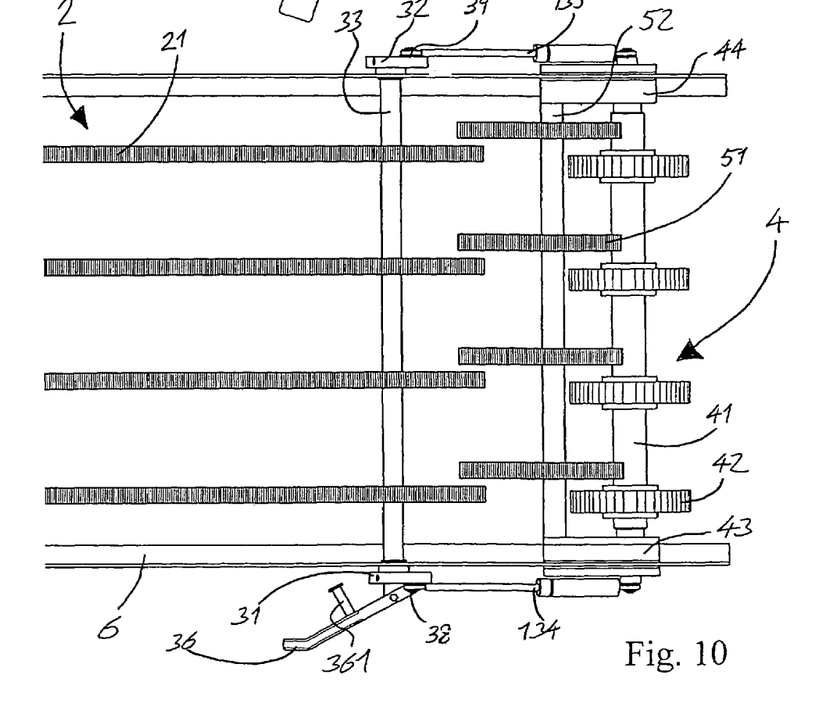
FIG. 10—shows a top view of the conveyor belt conveying system according to FIG. 9.

The FIGS. 9 and 10 show the device according to the FIGS. 7 and 8 in a loosened condition.

Figure 11:
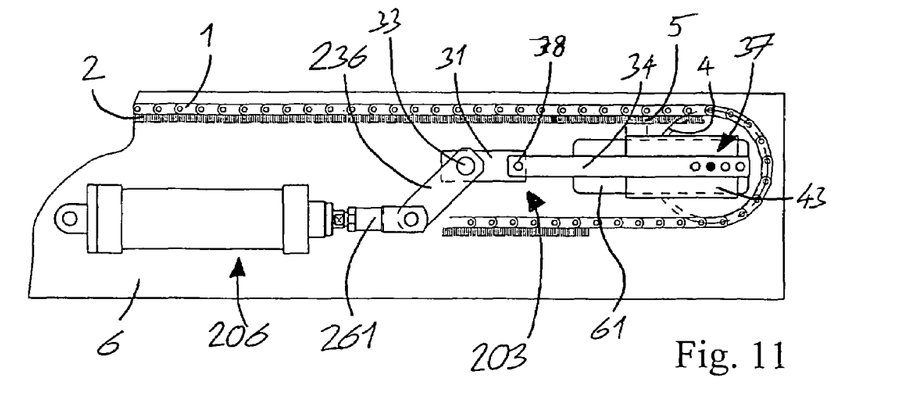
FIG. 11—shows a side view of a fourth embodiment of a conveyor belt conveying system with a device according to the invention for tensioning and loosening an endless conveyor belt, which is guided over deflection means, in tensioned condition, in which the device according to the invention is automated through a pneumatic cylinder.
Figure 12:
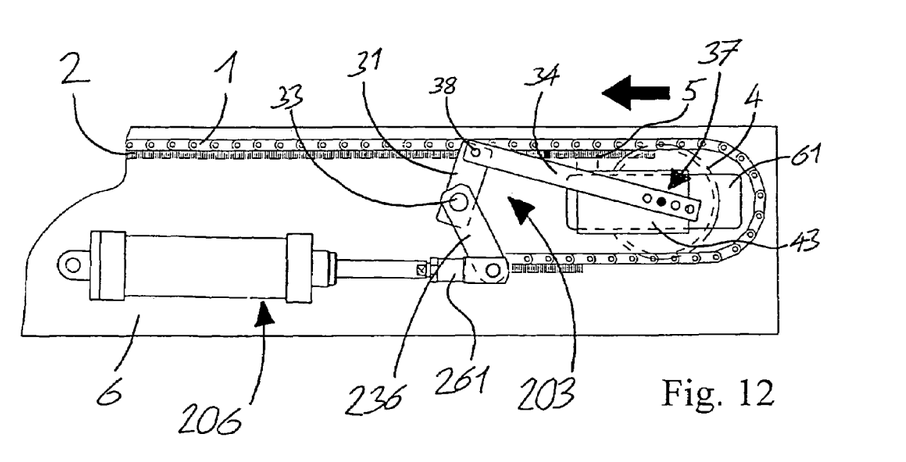
FIG. 12—shows a side view of the conveyor belt conveying system according to FIG. 11, in which the device according to the invention is shown in loosened condition.

In the FIGS. 11 and 12 a fourth embodiment is depicted of a conveyor belt conveying system with a device according to the invention in tensioned or loosened condition respectively. For the automation of the operation of an operating lever 236 the displacement means 203 comprise a pneumatic drive 206 with cylinder 262 and in that displaceable piston. The piston is rotatably connected via a coupling element 261 with the operating lever 236, while the cylinder 262 is rotatably connected with the frame 6 of the conveyor belt conveying system. If the device is in tensioned condition, the pneumatic drive 206 is arranged in the longitudinal direction parallel to the conveyor belt 1 and is there in contracted condition. For loosening of the conveyor belt 1 the pneumatic cylinder 206 rotates the operating lever 236 around the crank axle 33.

For the above described devices according to the invention other constructional variants are realizable.

What is claimed is:

1. A device for tensioning and loosening of an endless conveyor belt which is guided over deflection means, which is additionally supported between the deflection means by a support construction, wherein the device has displacement means for displacing of displaceable deflection means parallel to the direction of travel of the conveyor belt, the device comprising: support means, which are co-displaceable with the displacing of the displaceable deflection means parallel to the direction of travel of the conveyor belt, wherein the support means support the conveyor belt between the support construction and the displaceable deflection means wherein the support means are designed so that they support the conveyor belt throughout the entire region between the support construction and the displaceable deflection means, in which the conveyor belt is not supported by the support construction or the displaceable deflection means regardless of the displacement position of the displaceable deflection means.

2. The device according to claim 1, wherein the support means comprise at least two sliding bar pieces which are spaced apart from each other.

3. The device according to claim 1, wherein the displaceable deflection means are fixedly connected with the support means.

4. A device for tensioning and loosening of an endless conveyor belt which is guided over deflection means, which is additionally supported between the deflection means by a support construction, wherein the device has displacement means for displacing of displaceable deflection means parallel to the direction of travel of the conveyor belt, the device comprising: support means, which are co-displaceable with the displacing of the displaceable deflection means parallel to the direction of travel of the conveyor belt, wherein the support means support the conveyor belt between the support construction and the displaceable deflection means, the displacement means comprise two crank levers, which are connected via a crank axle such that they are not rotatable in relation to each other, and are each rotatably connected with a lever rod via a link, the lever rods for their part being connected with the displaceable deflection means.

5. The device according to claim 4, wherein the displaceable deflection means have a deflection axle and the displacement means are arranged such that the links in the tensioned conveyor belt lie in a plane between the deflection axle and the crank axle.

6. The device according to claim 4, wherein the displacement means have an operating lever connected with the crank axle, with which the crank axle is rotatable.

7. The device according to claim 4, wherein the crank levers or the lever rods are sprung designed, in particular as coil springs or pneumatic springs.

8. The device according to claim 4, wherein the lever rods have several connection gaps, via which they are adjustably connected with the crank levers or with the displaceable deflection means.

9. The device according to claim 4, wherein it has means for automated rotating of the crank levers, in particular a pneumatic drive.

* * * * *